(12) United States Patent
Hotta et al.

(10) Patent No.: US 9,941,574 B2
(45) Date of Patent: Apr. 10, 2018

(54) TELEVISION RECEIVER AND ELECTRONIC APPARATUS

(71) Applicant: KABUSHIKI KAISHA TOSHIBA, Minato-ku, Tokyo (JP)

(72) Inventors: Hiroyuki Hotta, Ome Tokyo (JP); Koichi Sato, Tachikawa Tokyo (JP); Hiroaki Hirao, Ome Tokyo (JP); Naoki Tani, Ome Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 337 days.

(21) Appl. No.: 14/618,293

(22) Filed: Feb. 10, 2015

(65) Prior Publication Data

US 2015/0155613 A1    Jun. 4, 2015

Related U.S. Application Data

(63) Continuation of application No. PCT/JP2013/056344, filed on Mar. 7, 2013.

(51) Int. Cl.
*H01Q 1/24* (2006.01)
*H01Q 1/48* (2006.01)
(Continued)

(52) U.S. Cl.
CPC ............ *H01Q 1/24* (2013.01); *G06F 1/1698* (2013.01); *H01Q 1/2266* (2013.01); *H01Q 1/42* (2013.01); *H01Q 1/48* (2013.01); *H01Q 9/42* (2013.01); *H01Q 13/16* (2013.01); *H04N 5/44* (2013.01); *G06F 1/1683* (2013.01)

(58) Field of Classification Search
CPC ......... H01Q 1/2266; H01Q 9/42; H01Q 13/16
See application file for complete search history.

(56) References Cited

U.S. PATENT DOCUMENTS 6,930,644 B2 * 8/2005 Konishi ................ G06F 1/1616
                                                    343/702
6,957,085 B2 * 10/2005 Shin ...................... G06F 1/1616
                                                    455/556.1

(Continued)

FOREIGN PATENT DOCUMENTS

JP      09-181637      7/1997
JP      2006-196994    7/2006

(Continued)

OTHER PUBLICATIONS

Antenna Theory: A Review, Balanis, Proc. IEEE vol. 80 No. 1 Jan. 1992.*

(Continued)

*Primary Examiner* — Jessica Han
*Assistant Examiner* — Amal Patel
(74) *Attorney, Agent, or Firm* — Knobbe, Martens, Olson & Bear, LLP

(57) ABSTRACT

According to one embodiment, an electronic apparatus includes a housing having a conductive portion in at least a part of the housing, a component which is accommodated in the housing and emits noise, an antenna which overlaps the component in a thickness direction of the housing, and a conductive member which electrically connects a ground of the antenna and the conductive portion of the housing.

8 Claims, 9 Drawing Sheets

(51) Int. Cl.
*H04N 5/44* (2011.01)
*H01Q 1/22* (2006.01)
*H01Q 1/42* (2006.01)
*H01Q 9/42* (2006.01)
*H01Q 13/16* (2006.01)
*G06F 1/16* (2006.01)

(56) References Cited

U.S. PATENT DOCUMENTS

| | | |
|---|---|---|
| 7,136,022 B2 | 11/2006 | Sato et al. |
| 7,477,199 B2 | 1/2009 | Hotta et al. |
| 7,916,089 B2 | 3/2011 | Schlub et al. |
| 8,369,097 B2 | 2/2013 | Murakami |
| 2008/0169981 A1 | 7/2008 | Hotta et al. |
| 2009/0073059 A1* | 3/2009 | Ikegaya .......... H01Q 9/42 343/702 |
| 2011/0310572 A1 | 12/2011 | Murakami |
| 2012/0068893 A1 | 3/2012 | Guterman et al. |

FOREIGN PATENT DOCUMENTS

| | | |
|---|---|---|
| JP | 2007-088975 | 4/2007 |
| JP | 2008-010523 | 1/2008 |
| JP | 2008-035084 | 2/2008 |
| JP | 2008-066779 | 3/2008 |
| JP | 2008-177668 | 7/2008 |
| JP | 2010-130101 | 6/2010 |
| JP | 2011-004263 | 1/2011 |
| JP | 2011004263 A * | 1/2011 |
| JP | 2012-003624 | 1/2012 |
| JP | 2012-070386 | 4/2012 |

OTHER PUBLICATIONS

International Preliminary Report and Translation of Written Opinion dated May 28, 2013 for corresponding International Application No. PCT/JP2013/056344, in 5 pages.

U.S. Appl. No. 12/724,207, filed Mar. 2010, Minaguchi et al.

International Search Report and Written Opinion for application No. PCT/JP2013/056344, dated May 28, 2013.

* cited by examiner

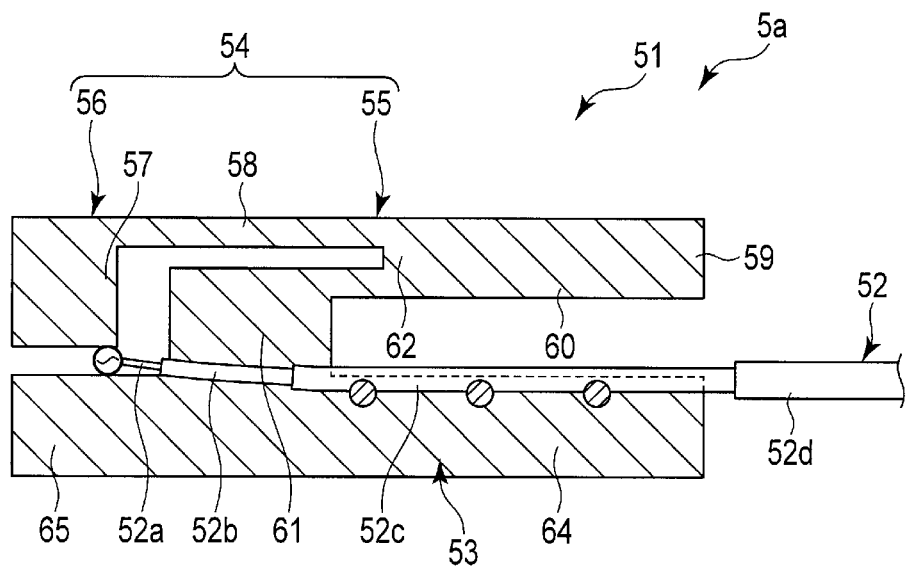
F I G. 7
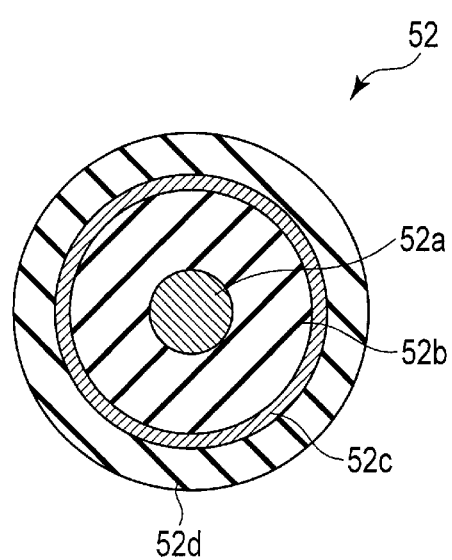
F I G. 8

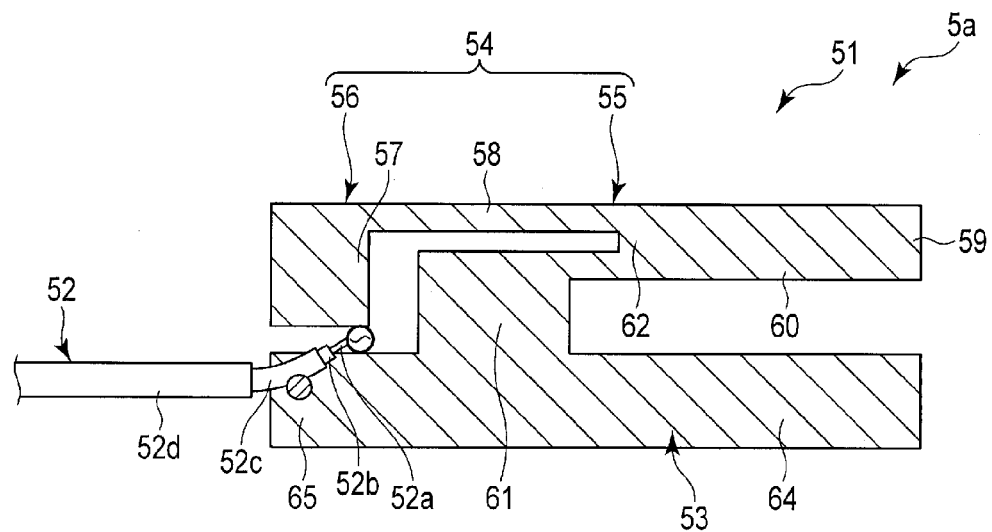
F I G. 9
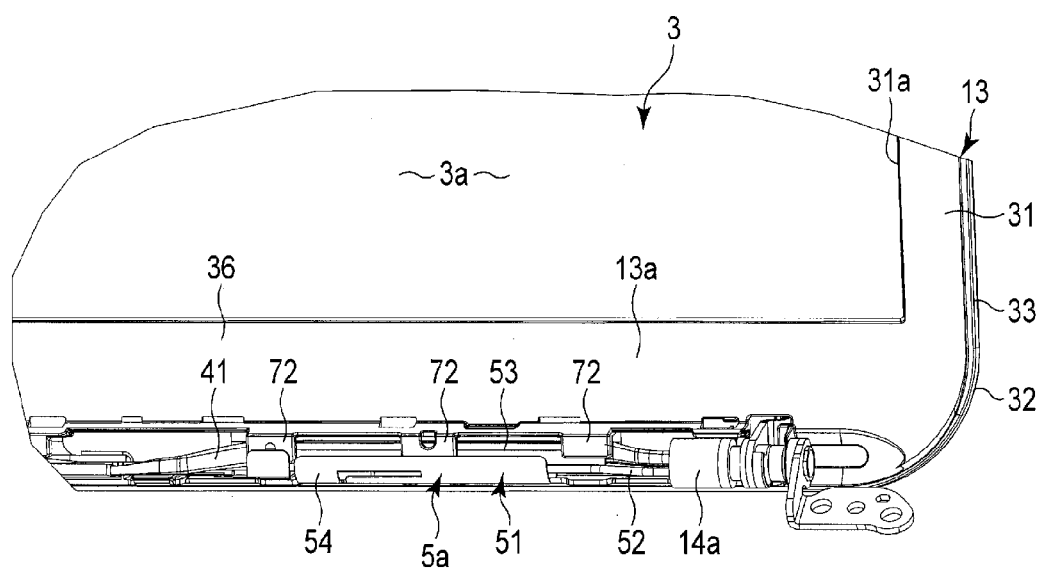
F I G. 10

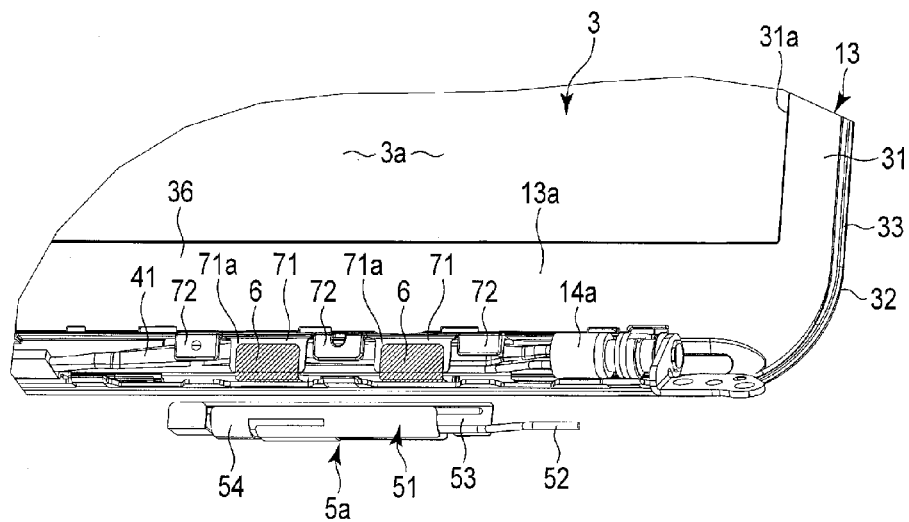
F I G. 11
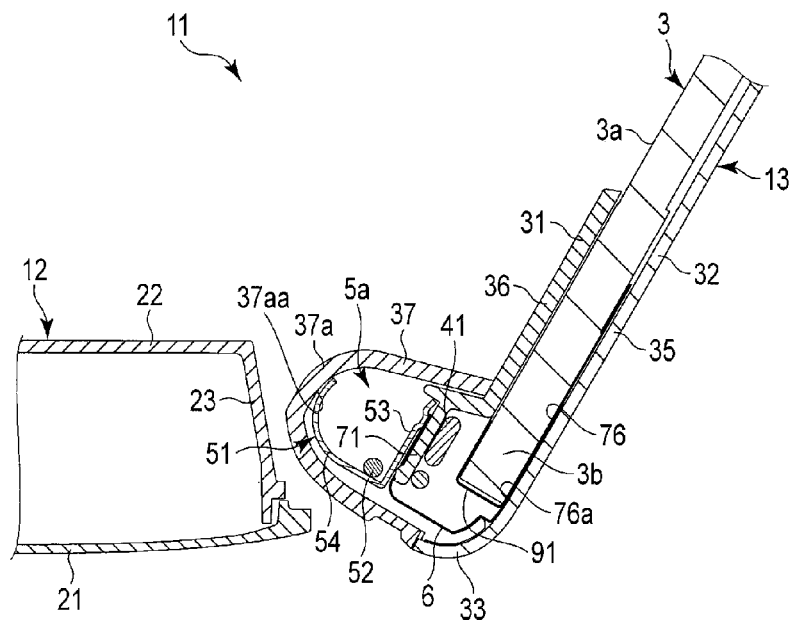
F I G. 12

ABSTRACT

TELEVISION RECEIVER AND ELECTRONIC APPARATUS

CROSS-REFERENCE TO RELATED APPLICATIONS

This application is a Continuation Application of PCT Application No. PCT/JP2013/056344, filed Mar. 7, 2013, the entire contents of which are incorporated herein by reference.

FIELD

Embodiments described herein relate generally to a television receiver and an electronic apparatus.

BACKGROUND

An electronic apparatus provided with an antenna is known.

With respect to such an electronic apparatus, improving the antenna performance is desired. An object of the embodiments is to provide an electronic apparatus whose antenna performance can be improved.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 7 is an illustration which schematically shows the antenna module shown in FIG. 2;

FIG. 8 is a cross-sectional view of an antenna cable shown in FIG. 7;

FIG. 9 is an illustration which schematically shows a modification of the antenna module shown in FIG. 2;

FIG. 10 is a perspective view showing a periphery of the antenna module shown in FIG. 2;

FIG. 11 is a perspective view showing a periphery of the antenna module shown in FIG. 2;

FIG. 12 is a cross-sectional view of the electronic apparatus shown in FIG. 2;

DETAILED DESCRIPTION

Figure 1:
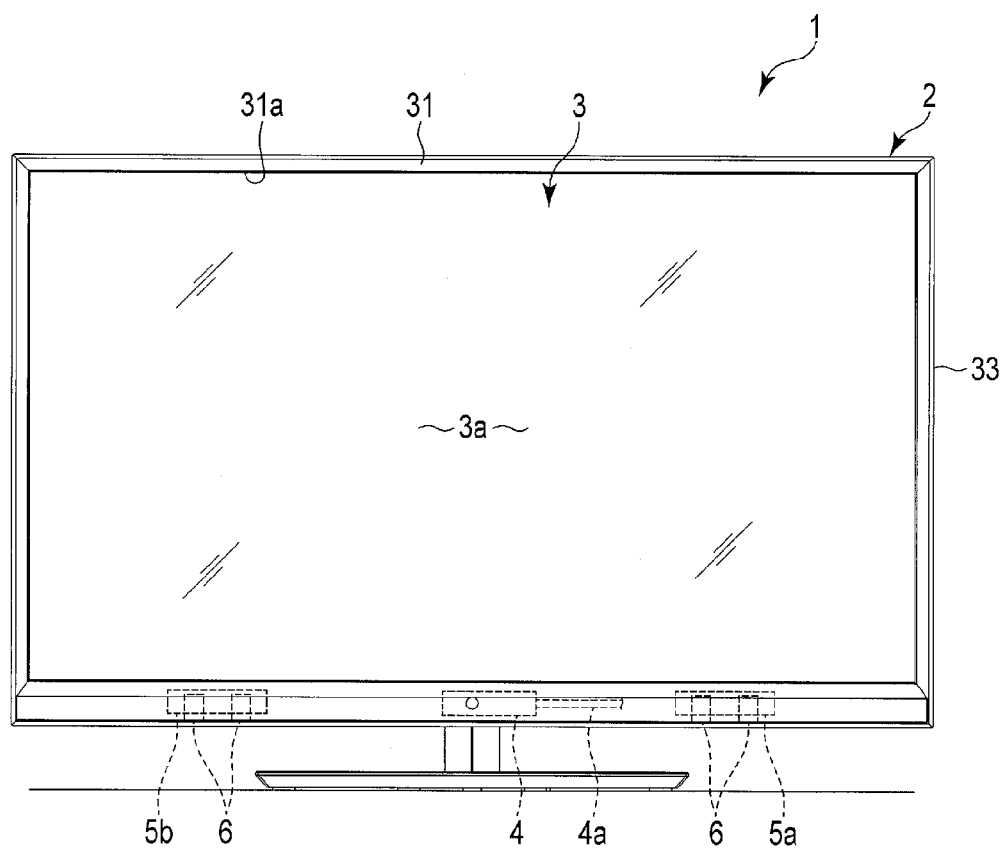
FIG. 1 is a front view of a television receiver according to a first embodiment.

Various embodiments will be described hereinafter with reference to the accompanying drawings.

In general, according to one embodiment, an electronic apparatus includes a housing, a component, an antenna, and a conductive member. A conductive portion is provided in at least a part of the housing. The component is accommodated in the housing and is configured to emit noise. The antenna overlaps the component in a thickness direction of the housing. The conductive member is configured to electrically connect a ground of the antenna and the conductive portion.

According to another embodiment, a television receiver includes a housing, a component, a module, an antenna, a conductive member, a first support portion, and a second support portion. The housing includes a conductive portion in at least a part of the housing. The component is accommodated in the housing and is configured to emit noise. The module is accommodated in the housing. The antenna includes a ground plate and an antenna element connected to the ground plate, the ground plate and the antenna element being formed integrally, the antenna overlapping the component and at least a part of the module in a thickness direction of the housing. The conductive member is bent to skirt the module, and includes a first portion between the antenna and the part of the module, and a second portion facing the module from a side opposite to the first portion and contacting an inner surface of the housing, the conductive member electrically connecting the ground plate and the conductive portion. The first support portion is positioned between the antenna and the part of the module. The second support portion faces the antenna from a side opposite to the first support portion, and is configured to hold the antenna as the ground plate is sandwiched between the first support portion and the second support portion. The antenna element has a folded shape and includes an outward path, a return path extending substantially parallel to the outward path, and a grounding portion which connects between the outward path and the ground plate, a width of the grounding portion being greater than or substantially equal to a width of the outward path. The first portion is mounted on a surface of the first support portion facing the ground plate, the conductive member contacting the ground plate as the ground plate is arranged between the first support portion and the second support portion. The component is within the bent conductive member. The ground plate includes a first convex portion protruding toward the first portion of the conductive member and contacting the conductive member. The first support portion includes a second convex portion protruding toward the ground plate and raising a part of the first portion toward the ground plate.

In the present specification, several examples of expression are provided for some of the elements. These examples of expression are presented by way of example only, and do not deny the possibility of the elements to be expressed by other wording. Further, different wording may be used for elements which are not phrased in more than one way.

First Embodiment

FIG. 1 shows a television receiver 1 according to a first embodiment. The television receiver 1 is an example of an electronic apparatus. The television receiver 1 includes a housing 2. In the housing 2, a display 3, a camera module 4, antenna modules 5a and 5b, and a conductive sheet 6 are accommodated.

The housing 2 according to the present embodiment is made of metal, for example, and at least a part of the housing 2 is conductive. The metal part of the housing 2 is an example of a conductive portion of the housing. The display 3 is, for example, a liquid crystal display (LCD), but is not limited to the LCD. The camera module 4 includes a cable 4a. The cable 4a is an example of a component which emits noise. At least a part of the antenna module 5a overlaps the cable 4a in a thickness direction of the housing 2. The conductive sheet 6 electrically connects a ground of the antenna module 5a and the housing 2.

Note that the details of the structure of the present embodiment are substantially the same as those of the second embodiment. Thus, by describing in detail the structure according to a second embodiment, a detailed description of the present embodiment will be omitted. In the first embodiment and the second embodiment, the same reference numeral is assigned to a structure having the identical or similar function.

Second Embodiment

Figure 2:
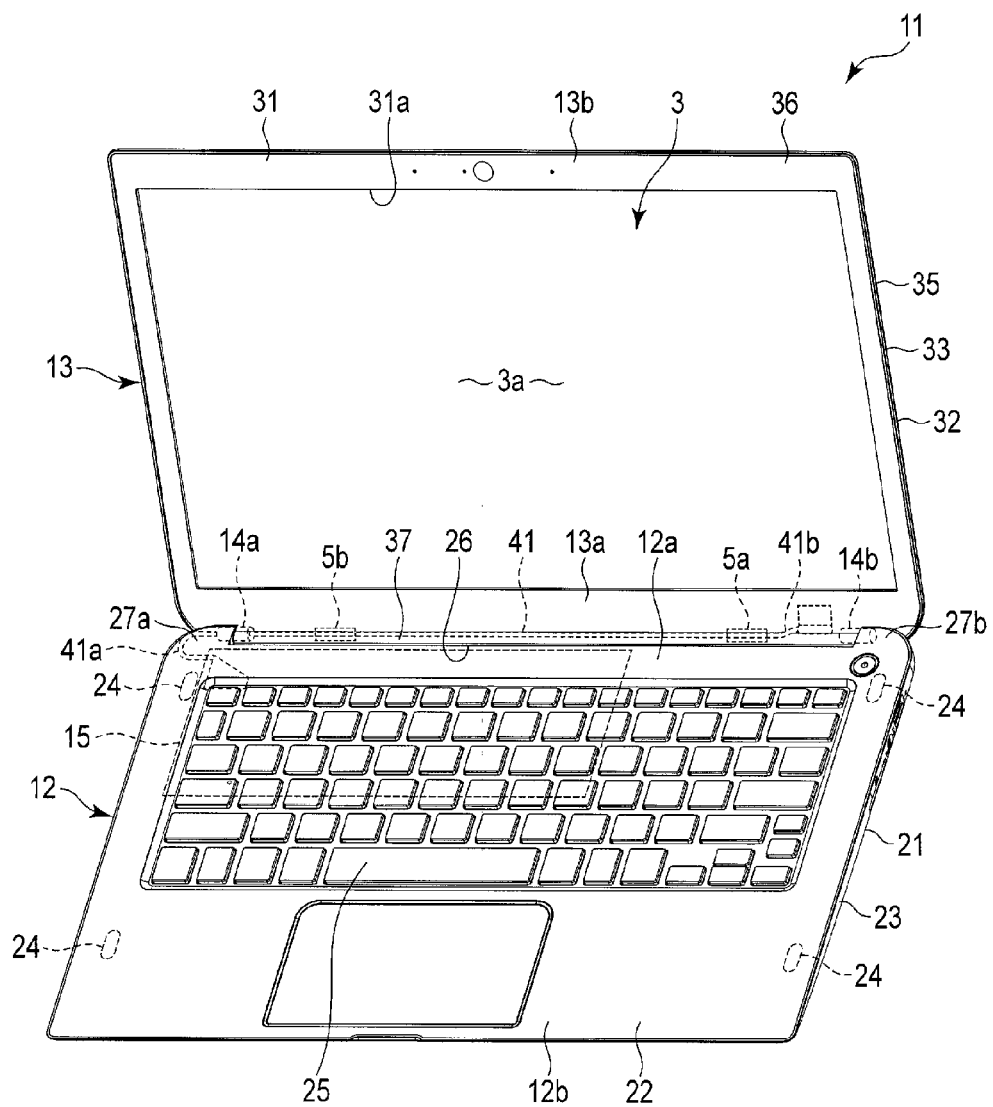
FIG. 2 is a perspective view of an electronic apparatus according to a second embodiment.

FIGS. 2 to 16 show an electronic apparatus 11 according to a second embodiment. As shown in FIG. 2, the electronic apparatus 11 of the present embodiment is, for example, a notebook portable computer or a laptop computer. Note that the electronic apparatus to which the present embodiment can be applied is not limited to the above examples. The present embodiment can be widely applied to various electronic devices including, for example, tablet-type or slate-type portable computers, mobile phones including smartphones, game machines, and various wireless devices.

As shown in FIG. 2, the electronic apparatus 11 includes a first housing 12, a second housing 13, and hinges 14a and 14b. The first housing 12 is, for example, a main body housing. In the first housing 12, a circuit board 15 as a main board, for example, is accommodated. The circuit board 15 is an example of a first module. Note that the module accommodated in the first housing 12 is not limited to the circuit board 15, and may be, for example, a radio unit or another module.

The first housing 12 includes a lower wall 21, an upper wall 22, and a peripheral wall 23, and is in the form of a flat box. The lower wall 21 may also be referred to as a bottom wall or a first wall. The upper wall 22 may also be referred to as a second wall. The peripheral wall 23 may also be referred to as a sidewall or a third wall. In the present specification, top, bottom, right and left are defined as seen from a user. Also, the part close to the user is defined as the front, and the part far from the user is defined as the back.

When the electronic apparatus 11 is placed on a desk, for example, the lower wall 21 faces an upper surface of the desk, a mounting surface, an external surface, or an external mounting surface. The lower wall 21 includes, for example, a plurality of foot portions 24. The foot portions 24 may also be referred to as a support portion. When the electronic apparatus 11 is placed on the desk, the foot portions 24 contact the upper surface of the desk and supports the electronic apparatus 11.

The upper wall 22 is positioned on the opposite side of the lower wall 21. The upper wall 22 extends substantially parallel to the lower wall 21, for example, with a space provided between the upper wall 21 and the lower wall 21. The upper wall 22 is provided with an input module 25, for example. The input module 25 may also be referred to as an input receiving module. An example of the input module 25 is a keyboard. Note that the input module 25 is not limited to the keyboard, and may be, for example, a touchpanel, a touch sensor, or another input device. The peripheral wall 23 extends in the direction of intersecting the upper wall 22 and the lower wall 21, that is, the direction substantially orthogonal to the upper wall 22 and the lower wall 21, for example, and connects between a peripheral portion of the lower wall 21 and a peripheral portion of the upper wall 22.

The first housing 12 includes a first end portion 12a and a second end portion 12b. The first end portion 12a is, for example, a rear end portion. The hinges 14a and 14b are fixed to or mounted on the first end portion 12a, and the hinges 14a and 14b are thereby supported. The second end portion 12b is positioned on the opposite side of the first end portion 12a, and is, for example, a front end portion.

As shown in FIG. 2, the first end portion 12a includes a recess 26. The recess 26 is depressed toward the input module 25. In other words, the first end portion 12a includes a pair of projecting portions 27a and 27b which are projected toward the back on both sides of the recess 26. The hinges 14a and 14b are mounted on the projecting portions 27a and 27b.

Meanwhile, the second housing 13 is, for example, a display housing. In the second housing 13, the display 3 is accommodated. The display 3 may also be referred to as a display module or a display unit. An example of the display 3 is a liquid crystal display, but is not limited to this. The display 3 includes a display screen 3a which displays an image or video. The display 3 is an example of a second module. The module accommodated in the second housing 13 is not limited to the display 3, and may be, for example, a camera module or another module.

The second housing 13 includes a front wall 31, a rear wall 32, and a peripheral wall 33, and is in the form of a flat box. The front wall 31 may also be referred to as a lower wall or a first wall. The rear wall 32 may also be referred to as a back wall, an upper wall, or a second wall. The peripheral wall 33 may also be referred to as a sidewall or a third wall. The front wall 31 includes an opening 31a through which the display screen 3a is exposed. The rear wall 32 is positioned on the opposite side of the front wall 31, and extends substantially parallel to the front wall 31. The rear wall 32 covers a rear surface of the display 3. The peripheral wall 33 extends in the direction of intersecting the front wall 31 and the rear wall 32, that is, the direction substantially orthogonal to the front wall 31 and the rear wall 32, for example, and connects between a peripheral portion of the front wall 31 and a peripheral portion of the rear wall 32.

The second housing 13 includes a first end portion 13a and a second end portion 13b. The first end portion 13a is, for example, a lower end portion. The hinges 14a and 14b are fixed to or mounted on the first end portion 13a, and the hinges 14a and 14b are thereby supported. The second end portion 13b is positioned on the opposite side of the first end portion 13a, and is, for example, an upper end portion.

The second housing 13 is structured by combining, for example, a cover 35, a mask 36 attached to the cover 35, and a hinge cover 37. The cover 35 includes, for example, the rear wall 32 and the peripheral wall 33. The mask 36 includes the front wall 31.

The hinge cover 37 is attached to the first end portion 13a of the second housing 13. The hinge cover 37 covers a part of the mask 36, i.e., a lower end portion of the mask 36, for example, and also the hinges 14a and 14b. The hinge cover 37 protrudes forward from the front wall 31. The hinge cover 37 forms a convex portion, which protrudes in a thickness direction of the second housing 13, on the second housing 13. The convex portion formed by the hinge cover 37 is positioned in the recess 26 of the first housing 12.

As shown in FIG. 2, the hinges 14a and 14b connect the first end portion 12a of the first housing 12 and the first end portion 13a of the second housing in such a way that they can be rotated or opened and closed. Thereby, the electronic apparatus 11 is openable and closable, deformable, or foldable. The electronic apparatus 11 is opened and closed between a first state and a second state.

The first state is the state in which the upper wall 22 of the first housing 12 and the front wall 31 of the second housing 13 overlap one another, and the electronic apparatus 11 is closed. In the first state, the display screen 3a and the input module 25 are hidden from the outside. Meanwhile, the second state is the state in which the second housing 13 is rotated with respect to the first housing 12, and the electronic apparatus 11 is opened. In the second state, the display screen 3a and the input module 25 are exposed to the outside.

Next, the implementation structure of the second housing 13 will be described.

The second housing 12 according to the present embodiment is made of metal, for example, and at least a part of the second housing 12 is conductive. The metal part of the second housing 13 is an example of a conductive portion of the housing. The second housing 13 may be made of synthetic resin and have conductivity as a conductive layer is provided on the inner surface of the second housing 13. As a method of providing the conductive layer on the inner surface of the second housing 13, there are ways such as performing conductive plating or conductive coating, or bonding metal foil. However, the method is not limited to the above. In this case, the conductive layer on the inner surface of the second housing 13 is an example of the conductive portion of the housing.

As shown in FIG. 2, the electronic apparatus 11 includes a cable 41, and antenna modules 5a and 5b. The cable 41 and the antenna modules 5a and 5b are accommodated in the housing 13. The cable 41 passes through the hinge 14a, and extends between the first housing 12 and second housing 13. The cable 41 is, for example, a harness. A first end portion 41a of the cable 41 is electrically connected to the first module in the first housing 12. The first module is, for example, the circuit board 15. A second end portion 41b of the cable 41 is electrically connected to the second module in the second housing 13. The second module is, for example, the display 3.

The cable 41 is an example of components that emit noise, and the cable 41 may adversely affect the wireless communication performance by emitting electromagnetic noise to the surroundings. The electromagnetic noise may also be referred to as radio noise or radio-frequency (RF) noise, for example. The components that emit noise are not limited to the above examples, and a cable of a camera module, or a circuit board 75 of the display 3 which will be described later, for example, are applicable where appropriate.

As shown in FIG. 2, the cable 41 extends along the first end portion 13a of the second housing 13 between the display 3 and the hinge 14a. That is, the cable 41 extends in an area covered by the hinge cover 37.

A pair of antenna modules 5a and 5b is located on the first end portion 13a of the second housing 13. The antenna modules 5a and 5b are positioned between a pair of hinges 14a and 14b. That is, the antenna modules 5a and 5b are disposed in the convex portion formed by the hinge cover 37, i.e., within the hinge portion, and are covered by the hinge cover 37. The antenna modules 5a and 5b are located separately along the first end portion 13a of the second housing 13.

As shown in FIG. 2, the cable 41 traverses the back of the antenna modules 5a and 5b. Therefore, as will be described later, at least a part of the antenna modules 5a and 5b overlaps the cable 41 in a thickness direction of the housing 13.

First of all, the structure of the antenna modules 5a and 5b of the present embodiment will be described in detail. The antenna modules 5a and 5b correspond to a wireless LAN, for example. Note that the antenna modules 5a and 5b are not limited to the above, and may be those corresponding to a third generation (3G) communication system or a Long Term Evolution (LTE) system of a mobile phone, for example. Here, the structure and the operation of the pair of antenna modules 5a and 5b are substantially the same as each other. Therefore, one of the antenna modules, i.e., the antenna module 5a, will be described in detail as a typical example of the antenna modules.

Figure 3:
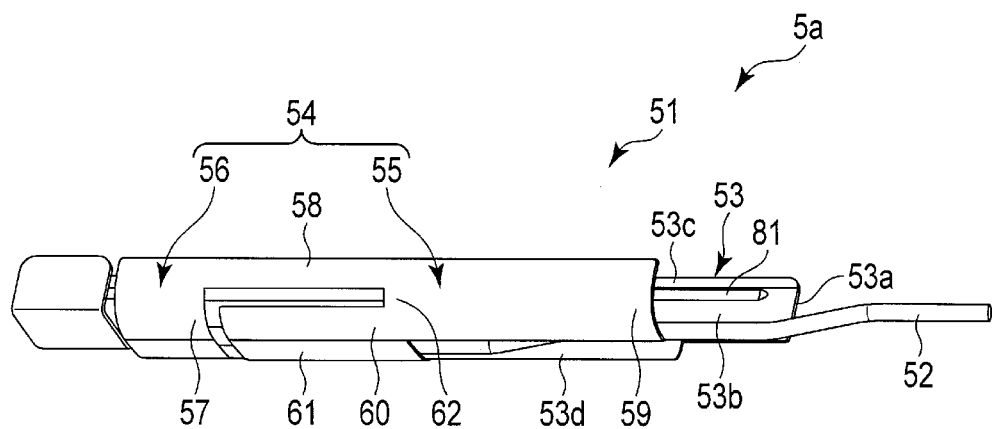
FIG. 3 is a perspective view of an antenna module shown in FIG. 2.
Figure 4:
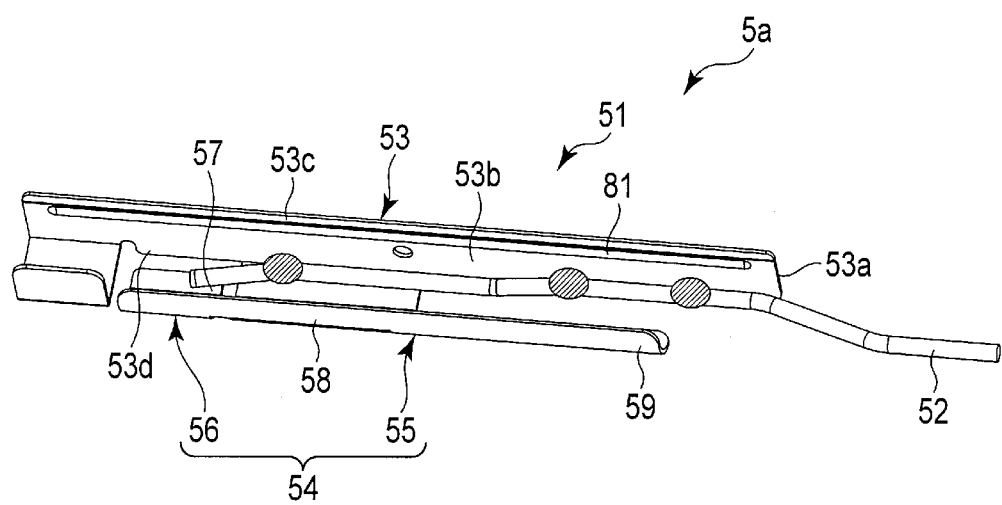
FIG. 4 is a perspective view of the antenna module shown in FIG. 2.

As shown in FIGS. 3 and 4, the antenna module 5a includes an antenna 51 and an antenna cable 52. The antenna 51 may also be referred to as an antenna body. The antenna 51 includes a ground plate 53 and an element 54. The ground plate 53 may also be referred to as a ground or an antenna ground.

The antenna 51 is formed by bending a piece of sheet metal sterically, for example. The ground plate 53 is in the shape of an elongated board, for example. The element 54 is bent in the direction of intersecting the ground plate 53, that is, the direction which is substantially orthogonal to the ground plate 53, for example. The antenna 51 may not be one which is formed by a sheet metal.

Figure 13:
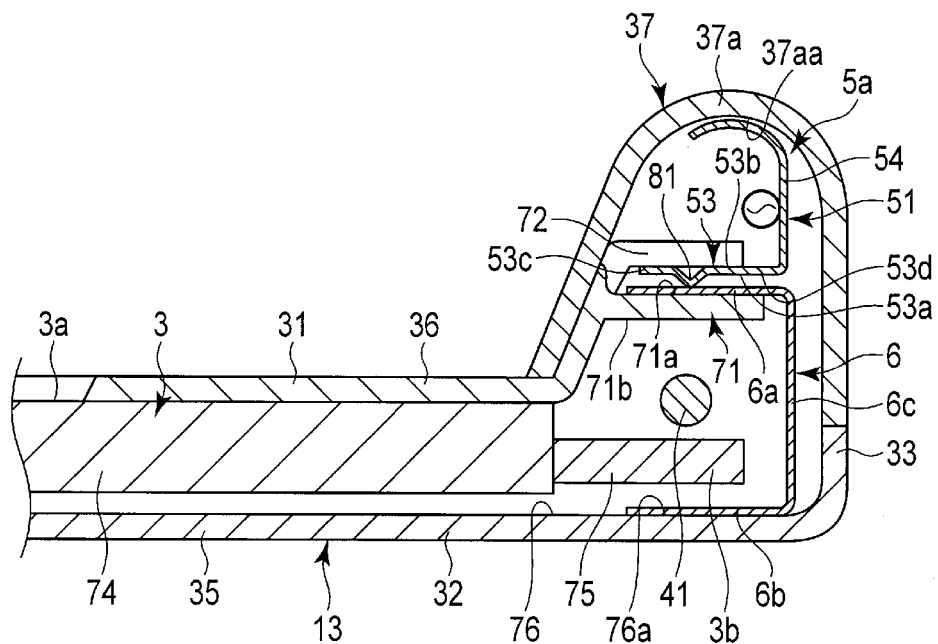
FIG. 13 is a cross-sectional view which schematically shows a support structure of an antenna module shown in FIG. 12.

Here, the hinge cover 37 includes a curved portion 37a including a curved or concave inner surface 37aa (FIGS. 12 and 13). The element 54 is bent along the curved inner surface 37aa of the hinge cover 37. Thus, even in a narrow space, the antenna performance can be ensured.

Figure 5:
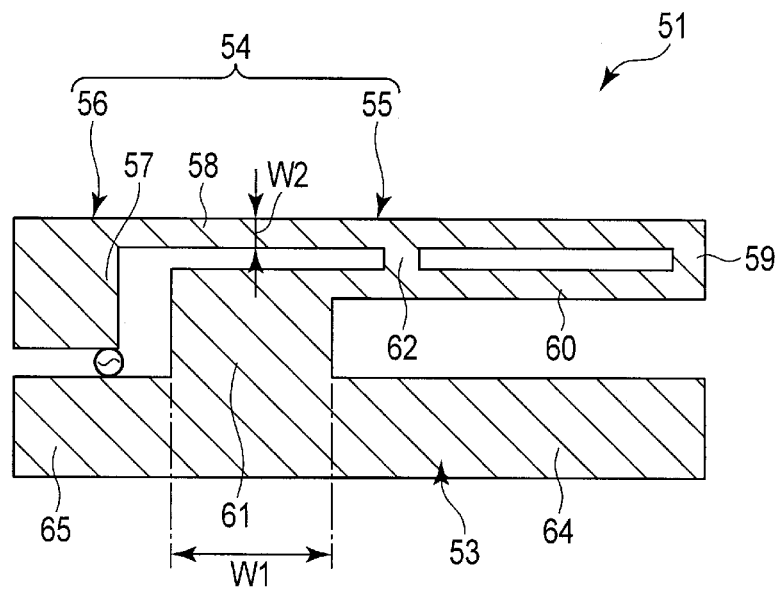
FIG. 5 is an illustration which schematically shows the antenna module shown in FIG. 2.

As shown in FIGS. 3 to 5, the element 54 according to the present embodiment includes a first antenna element 55 and a second antenna element 56, and is a folded antenna by which multi-resonance and broadband can be achieved. In the present embodiment, the ground plate 53, the first antenna element 55, and the second antenna element 56 are integrally formed by a piece of sheet metal, for example.

The first antenna element 55 is a folded one, and corresponds to a first frequency band. The first frequency band is approximately 2.4 GHz, for example. The first antenna element 55 includes a power feeding portion 57, an outward path 58, a folded portion 59, a return path 60, and a grounding portion 61.

The power feeding portion 57 is located near the ground plate 53 and is also provided with a power feed point, and the antenna cable 52 is electrically connected to the power feeding portion 57. The power feeding portion 57 is powered by the antenna cable 52. Also, the power feeding portion 57 is connected to an end of the outward path 58. The outward path 58 and the return path 60 extend substantially parallel to the ground plate 53. The folded portion 59 connects between an end portion of the outward path 58 and an end portion of the return path 60. The grounding portion 61 is located between the return path 60 and the ground plate 53, and connects the return path 60 and the ground plate 53.

Generally, there is a tendency that as the height of the antenna 51 is reduced, the input impedance is decreased. When the input impedance is decreased, the antenna performance is degraded by a mismatch loss at the power feeding point. Therefore, in the present embodiment, width W1 of the grounding portion 61 is made greater than width W2 of the return path 60, for example. Note that "width" here means the thickness in the direction substantially orthogonal to the direction of flow of a current or a signal within the first antenna element 55.

By forming width W1 of the grounding portion 61 to be large, a current flowing in the vicinity of the grounding portion 61 can be increased, and a current flowing in the vicinity of the power feeding portion 57 is thereby reduced. Thus, as a result, it becomes possible to design the input impedance of the antenna to be high. Accordingly, it is possible to reduce degradation of the antenna performance in a low-profile antenna. Further, the grounding portion 61 is a support portion or a connection portion of the element 54 with respect to the grounding portion 53. Thus, if the width W1 of the grounding portion 61 is made large, high strength can be imparted to the antenna 51. This is advantageous in maintaining the antenna shape in a structure in which the element 54 is bent with respect to the ground plate 53 as in the present embodiment.

The width W1 of the grounding portion 61 may be substantially the same as width W2 of the outward path 58, for example. Even in this case, it is possible to reduce the degradation of the antenna performance as compared to the case where the width W1 of the grounding portion 61 is less than the width W2 of the return path 60.

Also, in the present embodiment, a stub 62 is provided between the central portion of the outward path 58 and the central portion of the return path 60. The stub 62 may also be referred to as a short-circuit portion. The stub 62 connects between the central portion of the outward path 58 and the central portion of the return path 60. According to this structure, by adjusting the position of the stub 62, it is possible to adjust the value of the impedance.

Figure 6:
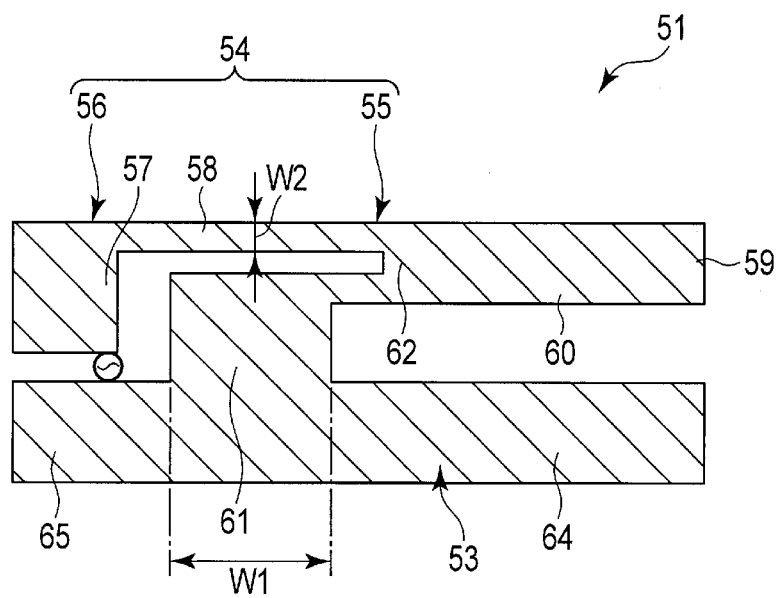
FIG. 6 is an illustration which schematically shows the antenna module shown in FIG. 2.

In the antenna 51 of the present embodiment, a space between the stub 62 and the folded portion 59 is actually filled in, as shown in FIG. 6. According to this structure, it is possible to provide antenna performance that is substantially the same as that of the antenna 51 shown in FIG. 5, and also increase manufacturing productivity as the element shape is simplified.

Meanwhile, the second antenna element 56 is a monopole antenna whose distal end is open. The second antenna element 56 corresponds to a second frequency band different from, for example, the first frequency band. The second frequency band is approximately 5 GHz, for example. The second element 56 is an element formed into a flat rectangle, for example. An example of the second frequency band is higher than the first frequency band, but it is not limited to the above figure, and may be lower than the first frequency band, for example.

The second antenna element 56 shares the power feeding portion 57 with the first antenna element 55, and is powered by the power feeding portion 57. The second antenna element 56 protrudes to the side opposite to the first antenna element 55 from the power feeding portion 57.

Next, with reference to FIGS. 7 and 8, the antenna cable 52 will be described. The antenna cable 52 is a coaxial cable, and includes a core wire 52a, a first insulating portion 52b, a ground portion 52c, and a second insulating portion 52d. The core wire 52a, the first insulating portion 52b, the ground portion 52c, and the second insulating portion 52d are arranged concentrically in this order from the inside. A current or a signal for transmission and reception of the antenna 51 flows in the core wire 52a.

As shown in FIG. 7, the ground plate 53 of the antenna 51 includes a first portion 64 positioned on the side of the first antenna element 55 relative to the power feeding portion 57, and a second portion 65 positioned on the side of the second antenna element 56 relative to the power feeding portion 57. The power feeding portion 57 may also be referred to as the power feeding point. The first portion 64 extends along the first antenna element 55. The second portion 65 extends along the second antenna element 56. The first portion 64 is longer than the second portion 65. This is due to the length of the first antenna element 55 in the direction substantially parallel to the ground plate 53 being greater than the length of the second antenna element 56 in the same direction.

As shown in FIG. 7, the core wire 52a of the antenna cable 52 is connected to the power feeding portion 57. The antenna cable 52 is drawn to the side of the first antenna element 55 from the power feeding portion 57, and extends along the first portion 64 of the ground plate 53. The ground portion 52c of the antenna cable 52 is connected to the first portion 64 of the ground plate 53 at several places, for example, at three points, by soldering.

FIG. 9 shows a modification of the antenna module 5a of the present embodiment. In this modification, the antenna cable 52 is drawn to the side of the second antenna element 56 from the power feeding portion 57, and extends along the second portion 65 of the ground plate 53. The ground portion 52c of the antenna cable 52 is connected to the second portion 65 of the ground plate 53 by soldering.

Also in the structure of such a modification, the power feed and the grounding can be secured. However, with the structure of FIG. 7, it is easier to secure a sufficient length of the portion extending along the ground plate 53 of the ground portion 52c of the antenna cable 52. Thus, the ground portion 52c can be connected at several places, for example, and the ground strength of the ground portion 52c and the ground plate 53 can be increased. Consequently, variations in the antenna performance due to soldering and wiring of cables can be reduced.

Also, according to the structure of FIG. 7, as compared to the structure of FIG. 9, the bending of the core wire 52a near the power feeding portion 57 can be moderated relatively easily. In this way, variations in the antenna performance due to the antenna cable 52 can be reduced.

Next, with reference to FIGS. 10 to 15, a support structure of the antenna 51 will be described. The support structure may also be referred to as a mounting structure. Further, in the following, the second housing 13 is simply referred to as the housing 13.

As shown in FIGS. 10 and 11, the first end portion 13a of the housing 13 is provided with first support portions 71 and second support portions 72. The first support portions 71 and the second support portions 72 are extending portions extending from the front wall 31, respectively. The extending portion may also be referred to as an overhang portion or a tongue portion. That is, the first support portions 71 and the second support portions 72 are provided integrally with, for example, the front wall 31 of the housing 13. The first support portions 71 and the second support portions 72 are covered by, for example, the hinge cover 37. The first support portions 71 and the second support portions 72 may be provided integrally with the other portion of the housing 13, for example, or provided independently of the housing 13.

The number of the first support portions 71 that are provided is two, for example. The number of the second support portions 72 that are provided is three, for example. The first support portions 71 and the second support portions 72 do not overlap one another in the thickness direction of the casing 13. The first support portions 71 and the second support portions 72 are disposed alternately along the first end portion 13a of the housing 13.

As shown in FIGS. 12 and 13, the first support portions 71 and the second support portions 72 are in the form of plates extending substantially parallel to the front wall 31 or the display screen 3a. That is, the first support portions 71 and the second support portions 72 extend in the direction of intersecting the thickness direction of the housing 13, in other words, the direction substantially orthogonal to the thickness direction of the housing 13, for example.

As shown in FIG. 13, the positions of the first support portions 71 and the second support portions 72 in the thickness direction of the housing 13 are different. The second support portions 72 are positioned more to the front side than, for example, the first support portions 71. That is, the second support portions 72 are closer to the inner surface 37aa of the curved portion 37a of the hinge cover 37 than the first support portions 71 are.

Thus, a groove in which the antenna 51 is mounted is formed between the first support portions 71 and the second support portions 72. It is possible to say that the antenna 51 is put in or inserted into this groove. The antenna 51 is held or secured by the first support portions 71 and the second support portions 72 as at least a part of the antenna 51 is sandwiched, inserted, or put in between the first support portions 71 and the second support portions 72.

In the present embodiment, the ground plate 53 of the antenna 51 extends substantially parallel to the first support portions 71 and the second support portions 72. The ground plate 53 of the antenna 51 includes a first surface 53a and a second surface 53b positioned on the opposite side of the first surface 53a.

The first support portions 71 face the first surface 53a of the ground plate 53. The second support portions 72 face the ground plate 53 of the antenna 51 from a side opposite to the first support portions 71. That is, the second support portions 72 face the second surface 53b of the ground plate 53. In the present embodiment, the antenna 51 is held or secured by the first support portions 71 and the second support portions 72 as the ground plate 53 is sandwiched, inserted, or put in between the first support portions 71 and the second support portions 72.

As shown in FIG. 13, at least a part of the antenna 51 overlaps the cable 41 in the thickness direction of the housing 13. Signals received by the antenna 51 may be affected by the noise from the cable 41.

Further, in the present embodiment, the display 3 includes a display 74 and the circuit board 75. The display 74 may also be referred to as a display main body. The circuit board 75 is mounted on the display 74, and positioned at an end portion 3b of the display 3. The circuit board 75 is electrically connected to the display 74. The circuit board 75 is an example of a component which emits noise. Also, the circuit board 75 is an example of the end portion 3b of the display 3 or the end portion of the module. The end portion 3b of the display 3 is not limited to the circuit board 75, and may be, for example, the end portion of the display 74.

At least a part of the antenna 51 overlaps at least a part of the display 3 in the thickness direction of the housing 13. At least a part of the antenna 51 overlaps the circuit board 75 (the end portion of the module), for example, in the thickness direction of the housing 13. Signals received by the antenna 51 may be affected by the noise from the circuit board 75.

As shown in FIG. 13, the first support portions 71 are located between the antenna 51 and the cable 41. Further, the first support portions 71 are located between the antenna 51 and the end portion 3b of the display 3, in other word, the circuit board 15, for example. Furthermore, the cable 41 is located between the first support portions 71 and the end portion 3b of the display 3, in other word, the circuit board 15, for example.

As shown in FIG. 13, each of the first support portions 71 includes a first surface 71a and a second surface 71b. The first surface 71a faces the antenna 51. The second surface 71b is positioned on the opposite side of the first surface 71a, and faces the cable 41 and the end portion 3b of the display 3.

The electronic apparatus 11 according to the present embodiment includes a conductive sheet 6 which electrically connects the ground of the antenna 51 to an inner surface 76 of the housing 13. The conductive sheet 6 is an example of each of a conductive portion and a conductive member. The conductive sheet 6 is, for example, a metal sheet such as one of aluminum. The conductive portion and the conductive member are not limited to a sheet member.

As shown in FIG. 11, the conductive sheet 6 is attached to, for example, the first surface 71a of the first support portion 71. For example, a plurality of conductive sheets 6 are provided for one antenna 51. As an example, two conductive sheets 6 are provided for one antenna 51. The conductive sheets 6 are attached to the first support portions 71, individually. As shown in FIG. 13, the conductive sheets 6 extend between the antenna 51 and the inner surface 76 of the housing 13.

The conductive sheets 6 according to the present embodiment have flexibility, for example. The conductive sheets 6 are bent to be substantially U-shaped such that they skirt the end portion 3b of the display 3, for example, and extend between the antenna 51 and the inner surface 76 of the housing 13.

For example, each of the conductive sheets 6 includes a first portion 6a, a second portion 6b, and a third portion 6c. The first portion 6a is positioned between the antenna 51 and at least a part of the display 3. More specifically, the first portion 6a is provided between the antenna 51 and the end portion 3b of the display 3, for example. Further, the first portion 6a is positioned between the antenna 51 and the cable 41.

The first portion 6a is mounted on the first surface 71a of the first support portion 71, for example. The first portion 6a is bonded to the first surface 71a of the first support portion 71 by an adhesive, for example. The first portion 6a is sandwiched between the first support portion 71 and the ground plate 53 of the antenna 51 and contacts the ground plate 53 of the antenna 51. That is, the first portion 6a contacts the ground plate 53 of the antenna 51 as the ground plate 53 of the antenna 51 is mounted, put in, or inserted between the first support portions 71 and the second support portions 72. The conductive sheets 6 are thereby electrically connected to the ground plate 53 of the antenna 51.

The second portion 6b faces the end portion 3b of the display 3 from a side opposite to the first portion 6a, for example. The second portion 6b is positioned between the inner surface 76 of the housing 13 and the end portion 3b of the display 3. Here, the inner surface 76 of the housing 13 includes an area 76a facing the end portion 3b of the display 3 from a side opposite to the antenna 51. The second portion 6b is mounted in the area 76a of the inner surface 76 of the housing 13. The second portion 6b is bonded to the inner surface 76 of the housing 13 by an adhesive having conductivity, for example. The second portion 6b contacts the area 76a of the inner surface 76 of the housing 13. The conductive sheets 6 are thereby electrically connected to the housing 13. It is also possible to say that the conductive sheets 6 are electrically connected to the ground of the housing 13.

The third portion 6c extends in the direction of intersecting the first portion 6a and the second portion 6b, that is, the direction substantially orthogonal thereto, for example, and extends between the first portion 6a and second portion 6b. The third portion 6c connects the first portion 6a and second portion 6b. In this way, the ground plate 53 of the antenna 51 is electrically connected to the housing 13 or the ground of the housing 13 via the conductive sheets 6.

Putting the above in another way, at least a part of the end portion 3b of the display 3 is located inside the conductive sheets 6 which are bent to be substantially U-shaped. That is, at least the part of the end portion 3b of the display 3 is surrounded by the conductive sheets 6 bent to be substantially U-shaped from three directions.

The conductive sheet bent to be substantially U-shaped that is intended here is not limited to one whose connection portions between the first portion 6a and the third portion 6c and between the second portion 6b and the third portion 6c are arcuate, but also includes one whose connection portions between the first portion 6a and the third portion 6c and between the second portion 6b and the third portion 6c are sharp. Further, the conductive sheet is not limited to one which can be bent to be substantially U-shaped.

As shown in FIG. 13, in the present embodiment, the cable 41 is passed through inside the conductive sheets 6 which are bent to be substantially U-shaped. That is, the cable 41 is located between the conductive sheets 6 and the end portion 3b of the display 3.

Figure 14:
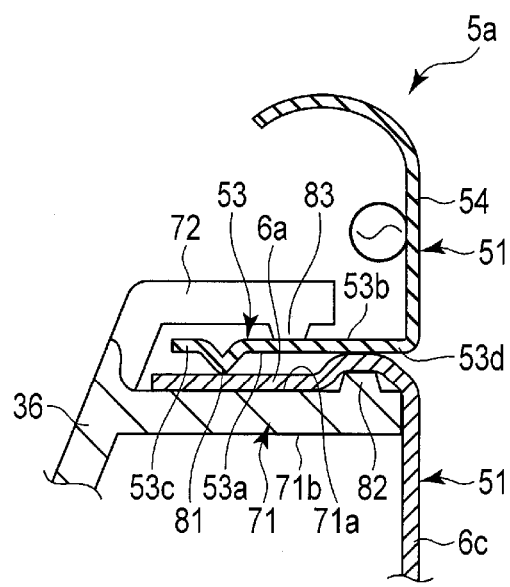
FIG. 14 is a cross-sectional view of the support structure of the antenna module shown in FIG. 13 in an enlarged scale.

As shown in FIG. 14, the ground plate 53 of the antenna 51 includes a first convex portion 81 which protrudes towards the first portion 6a of each of the conductive sheets 6. The first convex portion 81 may also be referred to as a first projection. The first convex portion 81 is formed as a part of the ground plate 53 is recessed toward the conductive sheets 6. As shown in FIG. 4, the first convex portion 81 extends linearly in a longitudinal direction of the ground plate 53, for example. The first convex portion 81 contacts the first portions 6a of the conductive sheets 6 and is electrically connected to the conductive sheets 6.

As shown in FIG. 14, the ground plate 53 is provided with a first end portion 53c and a second end portion 53d in a lateral direction of the ground plate 53. The lateral direction of the ground plate 53 may also be referred to as a width direction of the ground plate 53. The first end portion 53c is an end portion which is inserted into the back of the space between the first support portions 71 and the second support portions 72. The second end portion 53d is positioned on the opposite side of the first end portion 53c, and the element 54 is connected to the second end portion 53d. The first convex portion 81 is provided on, for example, the first end portion 53c of the ground plate 53.

Figure 15:
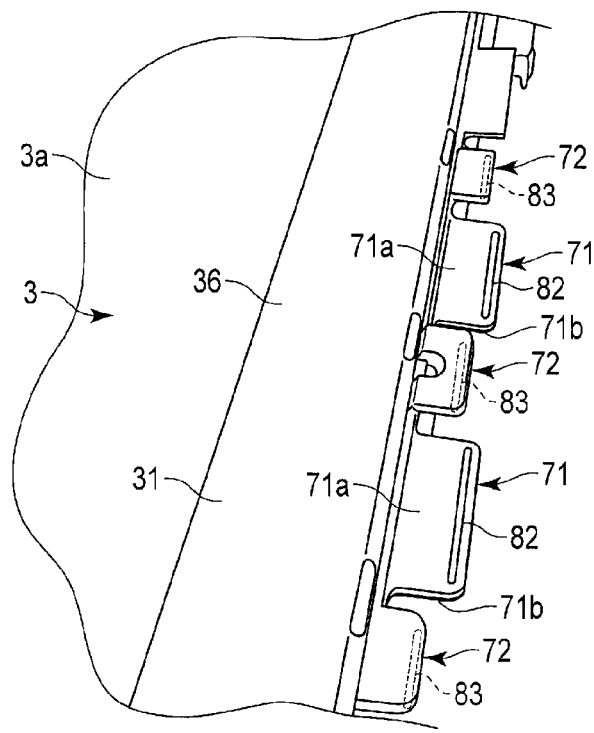
FIG. 15 is a perspective view of the support structure of the antenna module shown in FIG. 12.

As shown in FIG. 14, each of the first support portions 71 includes a second convex portion 82 which protrudes toward the ground plate 53 of the antenna 51. The second convex portion 82 may also be referred to as a second projection. The second convex portion 82 faces, for example, the second end portion 53d of the ground plate 53. As shown in FIG. 15, the second convex portion 82 extends linearly in the longitudinal direction of the ground plate 53, for example. The second convex portion 82 raises a part of the first portion 6a of the conductive sheet 6 toward the ground plate 53. The parts other than the above of the first portion 6a of the conductive sheet 6 are depressed. Accordingly, the first portion 6a of the conductive sheet 6 securely contacts the ground plate 53 of the antenna 51, and the ground plate 53 is electrically connected to the conductive sheet 6.

As shown in FIG. 14, each of the second support portions 72 includes a third convex portion 83 which protrudes toward the ground plate 53 of the antenna 51 from a side opposite to the second convex portion 82 of the first support portion 71. The third convex portion 83 may also be referred to as a third projection. The third convex portion 83 faces an area between, for example, the first end portion 53c and the second end portion 53d of the ground plate 53. As shown in FIG. 15, the third convex portion 83 extends linearly in the longitudinal direction of the ground plate 53, for example. The third convex portion 83 presses the ground plate 53 of the antenna 51 toward the first portion 6a of the conductive sheet 6. Accordingly, the first portion 6a of the conductive sheet 6 securely contacts the ground plate 53 of the antenna 51, and the ground plate 53 is electrically connected to the conductive sheet 6.

As shown in FIG. 12, the electronic apparatus 11 includes a second conductive sheet 91. The conductive sheet 91 is attached to the end portion 3b of the display 3. The conductive sheet 91 is attached to a surface of the display 3 facing the antenna 51, and is also attached to the area 76a of the inner surface 76 of the housing 13 as it is bent to be substantially U-shaped to skirt the end portion 3b of the display 3. As the conductive sheet 91 described above is provided, noise from the display 3 can be reduced.

According to the structure described above, the influence of weak radio waves emitted from peripheral components, such as the cable 41, can be reduced in the signals received by the antenna 51 mounted inside the electronic apparatus 11.

Recently, electronic apparatuses are required to be further miniaturized. In electronic apparatuses which are to be miniaturized, an area in which the antenna can be mounted is limited. Accordingly, the antenna may be forced to be mounted at a position which overlaps a noise component, for example, in the thickness direction of the housing 13.

Thus, according to the present embodiment, the electronic apparatus 11 includes the housing 13 having electric conductivity in at least a part of it, components which are accommodated in the housing 13 and emit noise, the antenna 51 which overlaps the components in the thickness direction of the housing 13, and the conductive member which electrically connects the ground of the antenna 51 and the conductive portion of the housing 13.

According to this structure, a path for releasing the noise from the antenna 51 to the housing 13 or the ground of the housing 13 is secured. Accordingly, part of the noise directed to the antenna 51 from the components can be released into the housing 13 from the antenna 51. Consequently, the degree of freedom of the mounting position for the antenna 51 is increased, and it is possible to achieve miniaturization of the electronic apparatus and improvement of the antenna performance at the same time.

Further, in the present embodiment, the conductive member electrically connects the ground of the antenna 51 and the housing 13. According to this structure, the ground of the antenna 51 can be secured to have a sufficient size, and thus, the antenna performance can be improved.

In the present embodiment, the conductive member is the conductive sheet 6 extending between the antenna 51 and the inner surface of the housing 13. According to this structure, a path for releasing the noise can be provided within the housing 13 with relatively simple and reliable construction.

In the present embodiment, the antenna 51 overlaps at least a part of the display 3 in the thickness direction of the housing 13. The conductive sheet 6 includes the first portion 6a which is bent to skirt the display 3 and positioned between the antenna 51 and the aforementioned part of the display 3, and the second portion 6b facing the display 3 from the side opposite to the first portion 6a and contacts the inner surface 76 of the housing 13. According to this structure, the shape of the conductive sheet 6 or the position where the conductive sheet 6 is to be arranged is less likely to be restricted by the shape of the display 3, and the conductive sheet 6 can be mounted by utilizing a limited space within the housing 13. This contributes to making the electronic apparatus 11 smaller.

In the present embodiment, the components which emit noise are located in the interior of the bent conductive sheet. With such a structure, the noise from the components can be directly shielded by the conductive sheet.

According to the present embodiment, the electronic apparatus 11 further includes the first support portions 71 located between the antenna 51 and the display 3, and the second support portions 72 facing the antenna 51 from the side opposite to the first support portions 71. The antenna 51 is held as a part of the antenna 51 is sandwiched between the first support portions 71 and the second support portions 72. With such a structure, the antenna 51 can be secured without using a fixing component such as a screw. This contributes to cost reduction of the electronic apparatus 11 and improvement of ease of assembly.

In the present embodiment, the antenna 51 includes the ground plate 53, and the antenna elements 55 and 56 connected to the ground plate 53, and the ground plate 53 and the antenna elements 55 and 56 are formed integrally. The antenna 51 is held such that the ground plate 53 is sandwiched between the first support portions 71 and the second support portions 72. According to this structure, the antenna 51 can be secured by utilizing the ground plate 53 of the antenna 51. This contributes to cost reduction of the electronic apparatus 11 and improvement of ease of assembly.

In the present embodiment, the first portion 6a of the conductive sheet 6 is arranged on a surface of each of the first support portions 71 facing the ground plate 53 of the antenna 51. The conductive sheet 6 contacts the ground plate 53 as the ground plate 53 is arranged between the first support portions 71 and the second support portions 72. According to this structure, by merely arranging the ground plate 53 between the first support portions 71 and the second support portions 72, electrical connection between the ground plate 53 and the conductive sheet 6 can be secured. That is, additional work of connecting the ground plate 53 and the conductive sheet 6 to each other can be omitted. This contributes to improvement of the ease of assembly of the electronic apparatus 11.

In the present embodiment, the ground plate 53 of the antenna 51 includes the first convex portion 81 protruding towards the first portion 6a of the conductive sheet 6 and contacting the conductive sheet 6. According to this structure, contact between the antenna 51 and the conductive sheet 6 can further be ensured.

In the present embodiment, each of the first support portions 71 includes the second convex portion 82 which protrudes toward the ground plate 53 of the antenna 51, and raises a part of the first portion 6a of the conductive sheet 6 toward the ground plate 53 of the antenna 51. According to this structure, contact between the antenna 51 and the conductive sheet 6 can further be ensured.

In the present embodiment, the antenna 51 is located between a pair of hinges 14a and 14b. According to this structure, since the antenna 51 can be mounted by utilizing a space between the pair of hinges 14a and 14b, the electronic apparatus 11 can be made further smaller.

In the present embodiment, the antenna 51 is formed by a sheet metal. According to this structure, the structure and the manufacturing of the antenna 51 are not complex, and thus, a method of mounting and manufacturing the same can be simplified.

Figure 16:
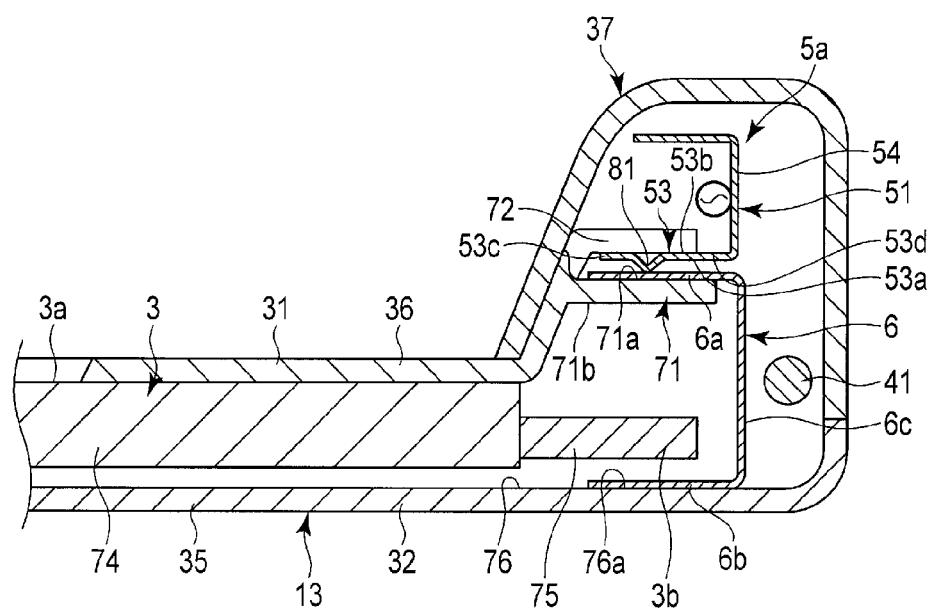
FIG. 16 is a cross-sectional view which schematically shows a modification of the electronic apparatus according to the second embodiment.

FIG. 16 shows a modification of the present embodiment. In this modification, the cable 41 is positioned outside the conductive sheet 6. Even with this structure, likewise the structure shown in FIG. 13, in signals received by the antenna, it is possible to reduce the influence of weak radio waves emitted from peripheral components such as the cable 41. Note that if the cable 41 is passed through the interior of the conductive sheet 6 as in the structure shown in FIG. 13, the electronic apparatus 11 can be made further smaller. Also, if the cable 41 is passed through the interior of the conductive sheet 6 as in the first embodiment described above, the conductive sheet 6 blocks the path of the noise, and thus, the noise can further be reduced.

Note that the present invention is not limited to the embodiments described above but the constituent elements can be modified variously without departing from the spirit of the invention when implemented. Various inventions can be achieved by suitably combining the constituent elements disclosed in the above embodiments. For example, some constituent elements may be deleted from the entire constituent elements shown in the embodiments. Further, constituent elements of different embodiments may be combined suitably.

For example, the positions where the antennas 5a and 5b are mounted are not limited to the space between the pair of hinges 14a and 14b. Also, the type of antenna 51 is not limited to a folded one.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A television receiver comprising:
    a housing comprising a conductive portion in at least a part of the housing;
    a cable in the housing configured to emit noise;
    a display in the housing;
    an antenna comprising a ground plate and an antenna element connected to the ground plate, the ground plate and the antenna element being formed integrally, the antenna overlapping the cable and at least a part of the display in a thickness direction of the housing;
    a conductive member which is bent to skirt the display, and comprises a first portion between the antenna and the part of the display, and a second portion facing the display from a side opposite to the first portion and contacting an inner surface of the housing, the conductive member electrically connecting the ground plate and the conductive portion;
a first support portion between the antenna and the part of the display; and
a second support portion facing the antenna from a side opposite to the first support portion, and configured to hold the antenna as the ground plate is sandwiched between the first support portion and the second support portion, wherein:
the antenna element comprises a folded portion, an outward path, a return path extending substantially parallel to the outward path, and a grounding portion which connects between the outward path and the ground plate, a width of the grounding portion taken in a direction perpendicular to a direction of a width of the outward path taken in a direction perpendicular to a flow of current in the outward path being greater than or substantially equal to the width of the outward path;
the first portion is mounted on a surface of the first support portion facing the ground plate, the conductive member contacting the ground plate as the ground plate is arranged between the first support portion and the second support portion;
the cable is within the bent conductive member;
the ground plate comprises a first convex portion protruding toward the first portion of the conductive member and contacting the conductive member; and
the first support portion comprises a second convex portion protruding toward the ground plate and raising a part of the first portion toward the ground plate.

2. An electronic apparatus comprising:
a housing comprising a conductive portion in at least a part of the housing;
a cable in the housing configured to emit noise;
an antenna overlapping the cable in a thickness direction of the housing, and comprising a ground plate and an antenna element connected to the ground plate, the antenna element comprises a folded portion, an outward path, a return path extending substantially parallel to the outward path, and a grounding portion which connects between the outward path and the ground plate, a width of the grounding portion taken in a direction perpendicular to a direction of a width of the outward path taken in a direction perpendicular to a flow of current in the outward path being greater than or substantially equal to the width of the outward path;
a conductive member configured to electrically connect a ground of the antenna and the conductive portion;
a pair of hinges configured to rotatably connect the housing and another housing; and
a circuit board in the housing,
wherein the antenna is between the pair of hinges,
the conductive member is a conducive sheet extending between the antenna and an inner surface of the housing,
the antenna overlaps at least a part of the circuit board in the thickness direction of the housing; and
the conductive sheet is bent to skirt the circuit board, and comprises a first portion between the antenna and the part of the circuit board, and a second portion facing the circuit board from a side opposite to the first portion and contacting the inner surface of the housing.

3. The electronic apparatus of claim 2, wherein the cable is within the bent conductive sheet.

4. The electronic apparatus of claim 2, further comprising:
a first support portion between the antenna and the part of the circuit board; and
a second support portion facing the antenna from a side opposite to the first support portion,
wherein the antenna is held as a part of the antenna is sandwiched between the first support portion and the second support portion.

5. The electronic apparatus of claim 4, wherein:
the ground plate and the antenna element being formed integrally; and
the antenna is held as the ground plate is sandwiched between the first support portion and the second support portion.

6. The electronic apparatus of claim 5, wherein:
the first portion is on a surface of the first support portion facing the ground plate; and
the conductive sheet contacts the ground plate as the ground plate is arranged between the first support portion and the second support portion.

7. The electronic apparatus of claim 5, wherein the ground plate comprises a first convex portion protruding toward the first portion and contacting the conductive sheet.

8. The electronic apparatus of claim 7, wherein the first support portion comprises a second convex portion protruding toward the ground plate and raising a part of the first portion toward the ground plate.

* * * * *